United States Patent [19]

Bäab et al.

[11] 4,229,094
[45] Oct. 21, 1980

[54] CAMERA WITH TRANSVERSELY DISPLACEABLE OBJECTIVE

[75] Inventors: Albert Bäab; Paui Himmelsbach, both of Bad Kreuznach, Fed. Rep. of Germany

[73] Assignee: Jos. Schneider GmbH & Co., Optische Werke Kreuznach, Bad Kreuznach, Fed. Rep. of Germany

[21] Appl. No.: 2,743

[22] Filed: Jan. 11, 1979

[30] Foreign Application Priority Data

Jan. 18, 1978 [DE] Fed. Rep. of Germany ....... 2801994

[51] Int. Cl.² .............................................. G03B 17/56
[52] U.S. Cl. .................................................. 354/286
[58] Field of Search ............... 354/286, 202, 232, 233, 354/272

[56] References Cited

U.S. PATENT DOCUMENTS

| | | | |
|---|---|---|---|
| 2,948,206 | 8/1960 | Swarofsky | 354/232 |
| 3,623,415 | 11/1971 | Atzmüller | 354/202 |
| 3,704,658 | 12/1972 | Uesugi | 354/202 |
| 3,762,295 | 10/1973 | Kitai | 354/286 X |
| 4,003,068 | 1/1977 | Hashimoto et al. | 354/286 |
| 4,081,812 | 3/1978 | Flöther | 354/286 |

*Primary Examiner*—Donald A. Griffin
*Attorney, Agent, or Firm*—Karl F. Ross

[57] ABSTRACT

A camera housing carries an objective whose optical axis O is tiltable and/or transversely shiftable with respect to a reference line A passing centrally through an exposure window for adjusting the position of an object plane and/or eliminating perspective distortion with shots taken at certain angles. A presettable iris diaphragm and an adjoining shutter in the lens assembly of the objective are tripped, at the instant of exposure, by a deformable linkage in the shape of an articulated or flexible shaft extending generally parallel to the optical axis from the housing to the objective.

4 Claims, 3 Drawing Figures

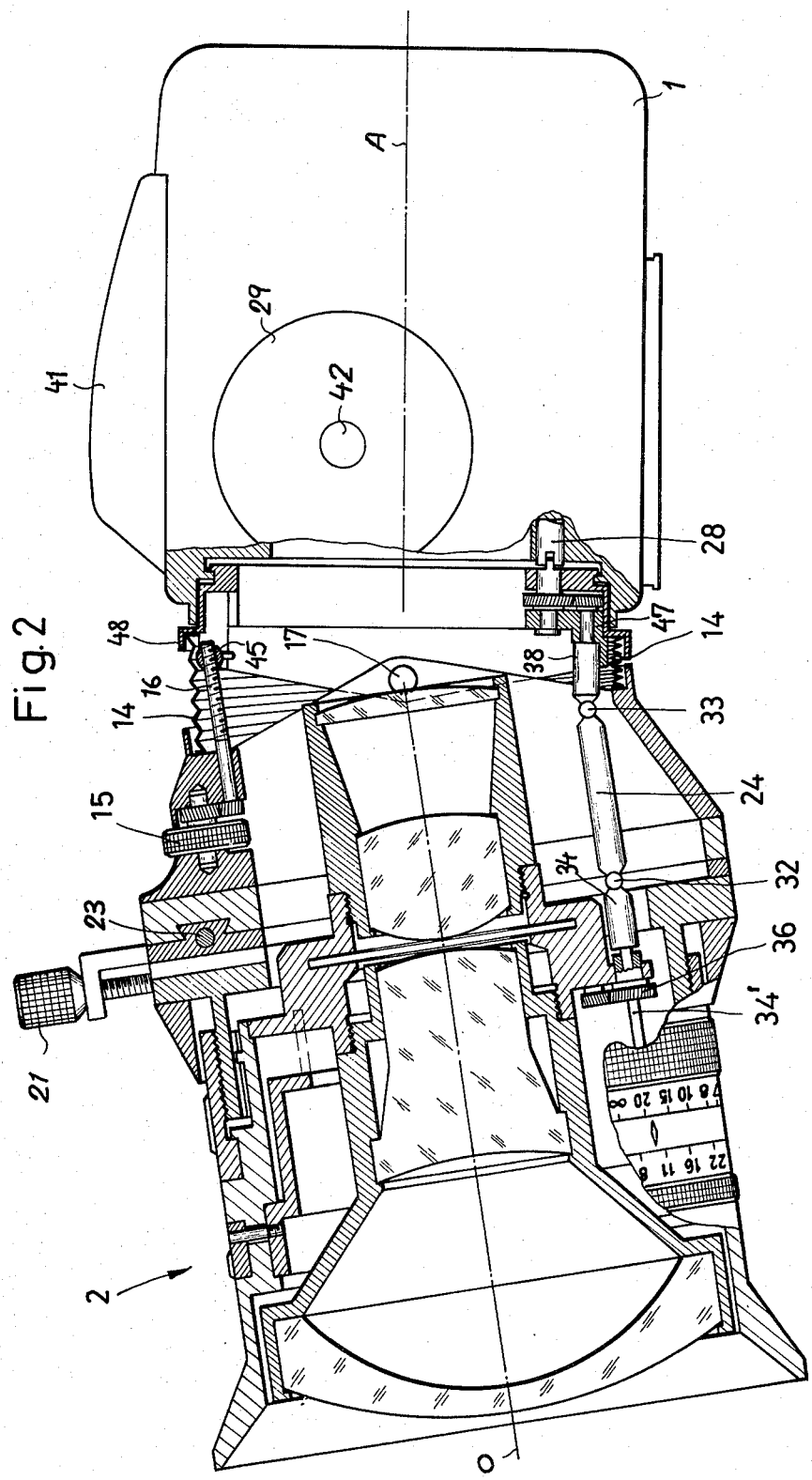

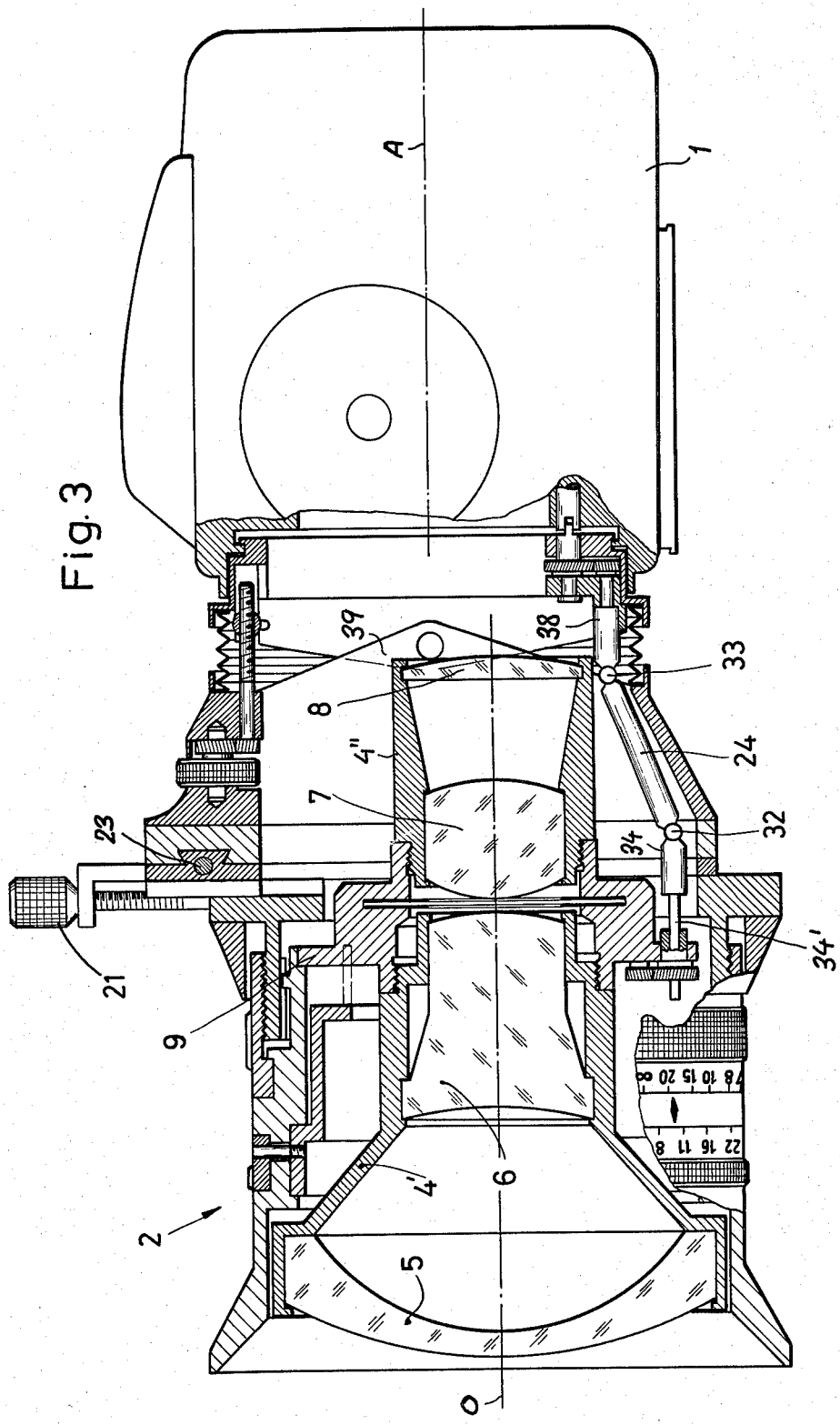

CAMERA WITH TRANSVERSELY DISPLACEABLE OBJECTIVE

FIELD OF THE INVENTION

Our present invention relates to a photographic camera whose objective is transversely displaceable (i.e. tiltable and/or shiftable) for the purpose of adjusting the position of an object plane and/or eliminating perspective distortion.

BACKGROUND OF THE INVENTION

In a camera whose objective has a optical axis coinciding with a reference line perpendicular to the surface of a film or other photosensitive medium, generally at the center of an exposure window formed by the camera housing, the object plane lies parallel to the image plane constituted by the film surface. When the objective is tilted so that the optical axis includes an angle other than 90° with the image plane, the image and object planes as well as the diaphragm plane of the objective intersect (according to Scheimpflug's law) along a common line at a finite distance from the axis. Such a tilting can therefore be used to bring objects into sharp focus which do not all lie in a relatively narrow zone transverse to the field of view.

A parallel shifting of the objective from its normal position is useful for the purpose of suppressing perspective distortion, e.g. when it is desired to take pictures of a tall building.

Objectives capable of either or both types of transverse adjustment are already well known. In such camera, however, it is generally not possible to trip the shutter of the objective by operating a pushbutton or similar release means on the camera housing. The setting of the diaphragm to a preselected stop during the taking of a picture, from a wide-open position in which the diaphragm is placed for view-finding and focusing purposes, also requires manipulation of a trigger at the objective in lieu of the more convenient operation of a control element (usually coupled with the release button) on the housing.

OBJECT OF THE INVENTION

The object of our present invention is to facilitate, in a camera of the character described, the actuation of exposure-controlling means on the objective (such as a shutter possibly associated with a presettable diaphragm) with the aid of release means on the camera housing.

SUMMARY OF THE INVENTION

We realize this object, in accordance with our present invention, by the provision of a deformable linkage extending generally parallel to the optical axis from the release means on the housing to the exposure-controlling means on the objective.

Such a linkage, pursuant to a more particular feature of our invention, comprises a shaft which is rotatable upon operation of the release means and has extremities that are independently tiltable relatively to a central portion. While a flexible shaft may be used for this purpose, we prefer to employ an articulated one with two universal joints enabling a mutually parallel displacement of opposite shaft extremities as well as a relative tilting thereof.

BRIEF DESCRIPTION OF THE DRAWING

The above and other features of our invention will now be described in detail with reference to the accompanying drawing in which:

FIG. 2 is a view similar to FIG. 1 but showing the camera objective tilted with respect to its housing; and FIG. 3 is another view similar to FIG. 1 in which the objective has been transversely shifted from its normal position.

SPECIFIC DESCRIPTION

Figure 1:
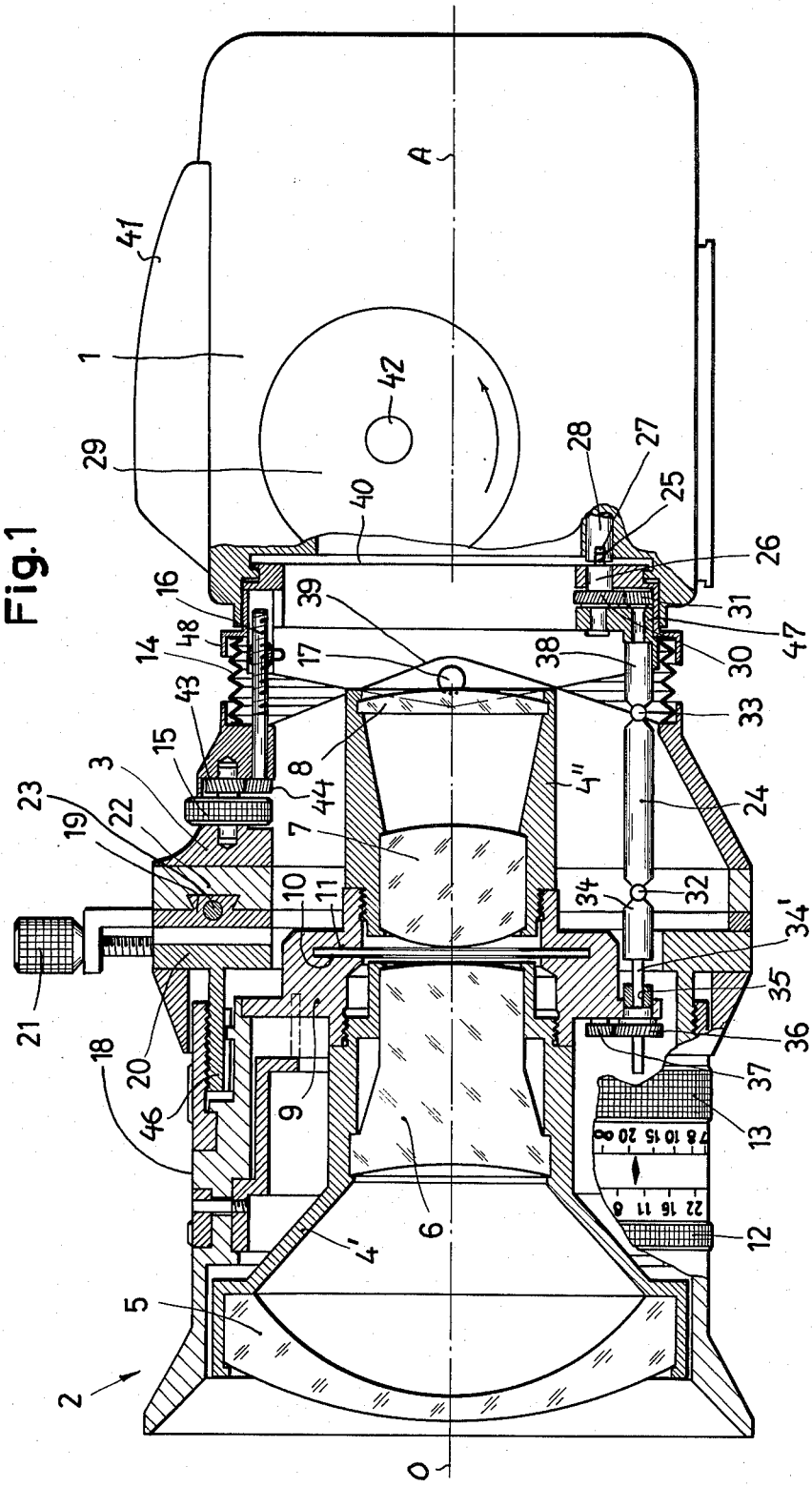
FIG. 1 is a side view, partly in axial section, of a camera embodying our invention.

In FIG. 1 we have shown a camera with a housing 1 and a preferably exchangeable objective 2 having lens members 5, 6, 7, 8 supported by front and rear lens mounts 4', 4". The two lens mounts are interconnected by an internally threaded ring 9 which is rigid with a front tube 18. This tube is connected with an annular supporting body 3 through the intermediary of a pair of cross-slides constituted by three dovetailed members 19, 20 and 22, member 20 being an annular disk integral with a skirt 46 which is threaded into tube 18. Members 19 and 20 are relatively slidable, in a vertical direction, under the control of a driver 21 including a knob whose stem is journaled in an extension of member 19 and threadedly engages member 20. A similar driver 23 with a knob (not shown) and a threaded stem analogously coacts with members 19 and 22 for relatively displacing them in a horizontal direction. Thus, the lens-supporting tube 18 can be shifted in two dimensions with respect to body 3 which is pivoted to a coupling ring 48 by a pair of horizontally separated wings 39 (only one shown) for swinging in a vertical plane about respective pins 17. A bellows 14 bridges the gap between housing 1 and objective body 3 in a lighttight manner; the camera-side end of the bellows is received within the ring 48 which is secured to the camera housing via the usual bayonet coupling.

The swinging of objective body 3 together with front tube 18 is manually controllable by a knurled wheel 15 which projects slightly from body 3 and is rigid with a gear 43 meshing with another gear 44 on a spindle 16 threadedly engaging a swivelable nut 45 (FIG. 2) on a forward extension of coupling ring 48.

Mounting ring 9 carries a conventional iris diaphragm 10 and a shutter 11 closely juxtaposed between lens members 6 and 7. Diaphragm 10 is of the presettable type; in a manner known per se, it is held in a wide-open position during focusing and snaps into a preselected stop position just prior to the opening of the shutter 11. The preliminary adjustment of the diaphragm is carried out with the aid of a presetting ring 12 while focusing is performed by a rotation of tube 18 via a ring 13 about its optical axis O, such rotation causing a relative axial shift between the lens support and the cylindrical skirt 46 threadedly engaged thereby.

The camera housing 1 carries a viewfinder 41, illuminated through a nonillustrated reflex prism or mirror in line with the objective, and a release button 42. A rotatable knob 29 on housing 1 serves for the advance of a film (not shown) whose photosensitive surface is perpendicular to a reference line A passing substantially midway through an exposure window at the front of the housing.

In accordance with our present invention, a displacement of release button 42 is transmitted to the diaphragm 10 and the shutter 11 by an articulated linkage including a shaft 24 extending generally parallel to optical axis O alongside the rear lens mount 4", thus outside the field of illumination. Shaft 24 has two extremities 34 and 38 connected with its central portion by a pair of universal joints 32 and 33 facilitating a relative tilting of these extremities (FIG. 2) and/or a relative shifting thereof parallel to each other (FIG. 3) under the control of wheel 15 and slide drivers 21, 23. Rear extremity 38 is journaled in a bearing 47 fixedly secured to coupling ring 48 and is rotatably connected via a pair of meshing gears 30, 31 with a stub shaft 26. Upon connection of objective 2 to housing 1 by its bayonet coupling, a tongue 25 on stub shaft 26 fits into a groove 27 of an extension shaft 28 which is drivingly connected with release button 42 so as to rotate upon depression of the latter. The front extremity 34 of shaft 24 terminates in a tongue 34' slidably received by a transverse slot 35 (FIG. 3) in the hub of a gear 36 which is journaled in mounting ring 9 and meshes with another gear 37 forming part of the otherwise nonillustrated, conventional shutter-trip mechanism. Thus, actuation of release button 42 causes the shaft 24 to rotate and to trip the shutter 11 along with the diaphragm 10, placing that diaphragm in its preselected position while the picture is being taken. Button 42 may also retract the reflector of the viewfinder during the exposure.

In the normal position of FIG. 1, optical axis O is aligned with reference line A so that the objective 2 is centered on the exposure window 40. When it is desired to focus the camera on certain objects in a zone which is not parallel to the film plane, i.e. nonvertical in the case here assumed, the user operates the wheel 15 to adjust the objective to a tilted position such as that shown in FIG. 2. When the object to be photographed requires an eccentric positioning of the objective to minimize perspective distortion, the user relatively shifts the dovetailed members 19, 20 and/or 19, 22 with the aid of driver 21 or 23, e.g. as shown in FIG. 3. The extent of these various adjustments, which may also be carried out concurrently, can be read on respective scales not shown.

The tongue 34' of extremity 34 and the mating slot 35 of gear 36 form an extensible coupling which allows for changes in the effective length of the deformable linkage 24. Thus, the position of FIG. 2 requires a deeper penetration of slot 35 by tongue 34' whereas the position of FIG. 3 calls for a partial withdrawal of the tongue from the slot. These coupling elements, however, are so dimensioned as to remain interengaged in all operating positions, thus insuring positive torque transmission from pushbutton 42 to the shutter-trip mechanism. A similar effect is achievable if the tripartite link 24, 34, 38 is replaced by a continuous flexible shaft.

It will be apparent that such a linkage may also be used to control only the presettable diaphragm if the shutter is carried on the camera housing or on the coupling ring 48, for example.

We claim:

1. In a camera comprising a housing with an exposure window and an objective secured to said housing for illuminating a photosensitive medium through said window, said objective being provided with exposure-controlling means and defining an optical axis normally aligned with a reference line passing substantially centrally through said window, adjustable mounting means securing said objective to said housing with freedom of disalignment of said optical axis from said reference line, and release means on said housing for initiating a picture-taking operation, the combination therewith of a mechanical linkage extending generally parallel to said optical axis from said release means to said exposure-controlling means for actuating same upon operation of said release means, said linkage including a rotatable shaft having a central portion, a first extremity connected with said central portion on the side of said housing, and a second extremity connected with said central portion on the side of said objective, said extremities being independently tiltable relatively to said central portion.

2. The combination defined in claim 1 wherein said exposure-controlling means includes a drive member on said objective forming an extensible coupling with said second extremity.

3. The combination defined in claim 2 wherein said exposure-controlling means comprises a presettable diaphragm and a shutter disposed between two lens members forming part of said objective.

4. The combination defined in claim 1, 2 or 3 wherein said extremities are articulated to said central portion by a pair of universal joints.

* * * * *